(12) United States Patent
Singh et al.

(10) Patent No.: US 11,846,174 B2
(45) Date of Patent: Dec. 19, 2023

(54) LOSS CIRCULATION DETECTION DURING CEMENTING OPERATIONS

(71) Applicant: HALLIBURTON ENERGY SERVICES, INC., Houston, TX (US)

(72) Inventors: John Paul Bir Singh, Kingwood, TX (US); Mikko Jaaskelainen, Kingwood, TX (US); John L. Maida, Houston, TX (US); Krishna Babu Yerubandi, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 545 days.

(21) Appl. No.: 17/020,402

(22) Filed: Sep. 14, 2020

(65) Prior Publication Data

US 2021/0238977 A1     Aug. 5, 2021

Related U.S. Application Data

(60) Provisional application No. 62/969,024, filed on Feb. 1, 2020.

(51) Int. Cl.
*E21B 47/00*     (2012.01)
*E21B 47/10*     (2012.01)
(Continued)

(52) U.S. Cl.
CPC .......... *E21B 47/005* (2020.05); *E21B 21/003* (2013.01); *E21B 33/14* (2013.01);
(Continued)

(58) Field of Classification Search
CPC ...... E21B 47/005; E21B 21/003; E21B 33/14; E21B 47/007; E21B 47/10; E21B 47/114; E21B 47/135
See application file for complete search history.

(56) References Cited

U.S. PATENT DOCUMENTS 2,838,116 A    6/1958   Clark, Jr. et al.
3,250,330 A    5/1966   Smith, Jr.
(Continued)

FOREIGN PATENT DOCUMENTS

EP     3114306 B1    1/2018
GB     2328968 A     3/1999
(Continued)

OTHER PUBLICATIONS

Fu, C.; Guo, T.; Liu, C.; Wang, Y.; Huang, B. Identification of the Thief Zone Using a Support Vector Machine Method. Processes 2019, 7, 373. https://doi.org/10.3390/pr7060373 (Year: 2019).*
(Continued)

*Primary Examiner* — Ian J Lobo
(74) *Attorney, Agent, or Firm* — NOVAK DRUCE CARROLL LLP

(57) ABSTRACT

Locating a loss zone while cementing a well casing in a well bore includes: inserting a fiber-optic cable into the well bore, wherein the fiber optic cable is part of one or more Distributed Fiber-Optic Sensing (DFOS) systems; detecting a loss circulation signature, while cementing the well casing, at a point along the fiber-optic cable by at least one of the one or more DFOS systems; and locating the loss zone within the well bore based on the point along the fiber-optic cable at which the loss circulation signature was detected.

22 Claims, 7 Drawing Sheets

(51) Int. Cl.
  *E21B 47/14* (2006.01)
  *E21B 47/005* (2012.01)
  *E21B 47/113* (2012.01)
  *E21B 47/135* (2012.01)
  *E21B 47/007* (2012.01)
  *E21B 21/00* (2006.01)
  *E21B 33/14* (2006.01)
  *E21B 47/107* (2012.01)
  *G06N 3/08* (2023.01)
  *E21B 47/103* (2012.01)

(52) U.S. Cl.
  CPC ............ *E21B 47/007* (2020.05); *E21B 47/10* (2013.01); *E21B 47/114* (2020.05); *E21B 47/135* (2020.05); *E21B 47/103* (2020.05); *E21B 47/107* (2020.05); *G06N 3/08* (2013.01)

(56) References Cited

U.S. PATENT DOCUMENTS

| | | | |
|---|---|---|---|
| RE27,459 E | 8/1972 | Guinn et al. | |
| 4,832,121 A | 5/1989 | Anderson | |
| 5,275,038 A | 1/1994 | Sizer et al. | |
| 5,375,661 A | 12/1994 | Daneshy et al. | |
| 5,892,176 A | 4/1999 | Findlay et al. | |
| 5,996,689 A | 12/1999 | Head | |
| 6,268,911 B1 | 7/2001 | Tubel et al. | |
| 6,367,548 B1 | 4/2002 | Purvis et al. | |
| 6,531,694 B2 | 3/2003 | Tubel et al. | |
| 6,532,839 B1 | 3/2003 | Kluth et al. | |
| 7,055,604 B2 | 6/2006 | Jee et al. | |
| 7,448,448 B2 | 11/2008 | Lovell et al. | |
| 7,617,873 B2 | 11/2009 | Lovell et al. | |
| 9,074,462 B2 * | 7/2015 | Pearce | E21B 47/107 |
| 9,708,867 B2 | 7/2017 | Lovell et al. | |
| 11,098,576 B2 * | 8/2021 | Cerrahoglu | E21B 47/103 |
| 2002/0007945 A1 | 1/2002 | Neuroth et al. | |
| 2009/0294174 A1 | 12/2009 | Harmer et al. | |
| 2012/0155508 A1 * | 6/2012 | Dria | E21B 47/007 374/107 |
| 2014/0180592 A1 | 6/2014 | Ravi et al. | |
| 2019/0277135 A1 | 9/2019 | Zha | |
| 2020/0284937 A1 * | 9/2020 | Zhang | G01V 1/50 |
| 2021/0222540 A1 * | 7/2021 | Kroczka | G01M 11/086 |

FOREIGN PATENT DOCUMENTS

| | | | | |
|---|---|---|---|---|
| WO | 2002057805 A2 | 7/2002 | | |
| WO | 2004018840 A1 | 3/2004 | | |
| WO | WO-2016186612 A1 * | 11/2016 | ............ | E21B 33/16 |
| WO | 2019132680 A1 | 7/2019 | | |
| WO | 2019132860 A1 | 7/2019 | | |
| WO | WO-2019132860 A1 * | 7/2019 | ............ | E21B 33/14 |

OTHER PUBLICATIONS

Johnson, D.O., et al., Society of Petroleum Engineers (SPE) Paper # 77460, "Identification of Steam Breakthrough Intervals Using DTS Technology," Sep. 2002.

Fryer, V., et al., Society of Petroleum Engineers (SPE) Paper # 92962, "Monitoring of Real-Time Temperature Profiles Across Multizone Reservoirs During Production and Shut-In Periods Using Permanent Fiber-Optic Distributed Temperature Systems," Apr. 2005.

Economides, M.J., "a practical companion to reservoir stimulation," Developments in Petroleum Science, vol. 34, 1992.

Economides, M.J. et al., "Reservoir Stimulation," Second Edition, 1989.

Smith, Robert, et al., Society of Petroleum Engineers (SPE) Paper # 2686, "Computer Study of Factors Affecting Temperature Profiles in Water Injection Wells," Journal of Petroleum Engineering, p. 1447, Nov. 1970.

Rajah, Benny, et al., Society of Petroleum Engineers (SPE) Paper # 29290, "Experiences and Results of Acid Prepacking and Gravelpacking Wells in the West Luton Field in Sarawak, Malaysia," Mar. 1995.

Wehunt, Jr., C.D., Society of Petroleum Engineers (SPE) Paper # 20137, "Evaluation of Alternating Phase Fracture Acidizing Treatment Using Measured Bottomhole Pressure," Mar. 1990.

Nelson, R.L., et al., Society of Petroleum Engineers (SPE) Paper # 39943, "Multiple Pad-Acid Fracs in a Deep Horizontal Well," Apr. 1998.

Krawietz, T.E., et al., Society of Petroleum Engineers (SPE) Paper # 27809, "Horizontal Well Acidizing of a Carbonate Formation: A Case History of Lisburne Treatments, Prudhoe Bay, Alaska," Nov. 1996.

International Search Report, Response and Written Opinion, PCT Application No. PCT/US2020/051547, dated Jan. 20, 2021.

GCC Examination Report for application No. GC 2021-41143, dated Oct. 31, 2021, 3 pages.

* cited by examiner

LOSS CIRCULATION DETECTION DURING CEMENTING OPERATIONS

CROSS-REFERENCE TO RELATED APPLICATIONS

This application claims the benefit of U.S. Provisional Application No. 62/969,024, filed Feb. 1, 2020, which is incorporated herein by reference.

TECHNICAL FIELD

The subject matter herein generally relates to well bore cementing operations, and in particular, cementing of a well bore casing in a well bore.

BACKGROUND

A well bore is often drilled into a subterranean formation for recovering hydrocarbons, storing hydrocarbons, or injecting other fluids, such as carbon dioxide or aqueous fluids, for storage or disposal, or for recovery of deposited minerals or geothermal energy.

Typically, the well bore is lined with a steel casing through which fluid is conveyed under pressure. The steel casing is cemented in the well bore in order to provide zonal isolation so that the fluid is extracted from or delivered to selected zones or layers of the formation and prevented from leaking into other zones or layers of the formation and leaking into the surface environment. The cement also bonds to and supports the casing.

Loss circulation is the total or partial loss of drilling fluids or cement to high-permeability zones, cavernous formations and natural or induced fractures (i.e., loss or "thief" zones) during the drilling or completion of a well. When loss circulation occurs, the drilling fluids or cement enter the loss zone instead of returning up the annulus around the casing.

During a cementing operation, loss zones are often detected too late. Conventionally, the only way to detect losses are when the returns don't match the flow in the well bore. As the cementing operation, by design, has transients associated with it, the mismatch between the returns and inputs is expected. Due to this, many times a loss zone is never detected or is only detected when the top of cement (as detected, for example, by a bond log) is not where it is expected to be, resulting in delays and added expense.

BRIEF DESCRIPTION OF THE DRAWINGS

In order to describe the manner in which the features and advantages of this disclosure can be obtained, a more particular description is provided with reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
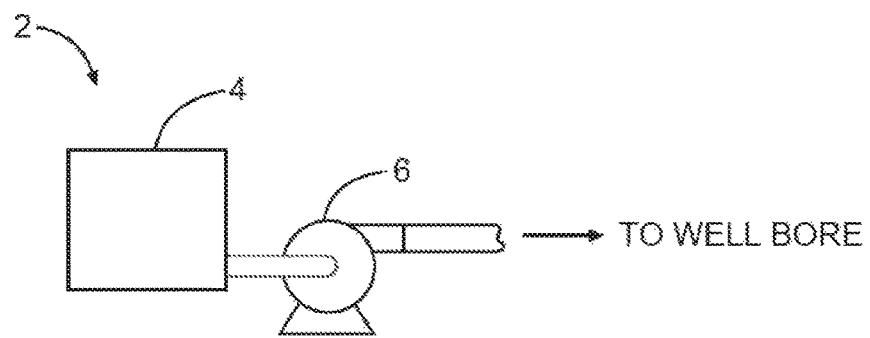
FIG. 1 illustrates a system for preparation and delivery of a cement composition to a well bore in accordance with aspects of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be apparent from the description, or can be learned by practice of the principles disclosed herein. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

As used herein, "cement" is any kind of material capable of being pumped to flow to a desired location, and capable of setting into a solid mass at the desired location. "Cement slurry" designates the cement in its flowable state. In many cases, common calcium-silicate hydraulic cement is suitable, such as Portland cement. Calcium-silicate hydraulic cement includes a source of calcium oxide such as burnt limestone, a source of silicon dioxide such as burnt clay, and various amounts of additives such as sand, pozzolan, diatomaceous earth, iron pyrite, alumina, and calcium sulfate. In some cases, the cement may include polymer, resin, or latex, either as an additive or as the major constituent of the cement. The polymer may include polystyrene, ethylene/vinyl acetate copolymer, polymethylmethacrylate polyurethanes, polylactic acid, polyglycolic acid, polyvinylalcohol, polyvinylacetate, hydrolyzed ethylene/vinyl acetate, silicones, and combinations thereof. The cement may also include reinforcing fillers such as fiberglass, ceramic fiber, or polymer fiber. The cement may also include additives for improving or changing the properties of the cement, such as set accelerators, set retarders, defoamers, fluid loss agents, weighting materials, dispersants, density-reducing agents, formation conditioning agents, loss circulation materials, thixotropic agents, suspension aids, or combinations thereof.

The cement compositions disclosed herein may directly or indirectly affect one or more components or pieces of equipment associated with the preparation, delivery, recapture, recycling, reuse, and/or disposal of the disclosed cement compositions. For example, the disclosed cement compositions may directly or indirectly affect one or more mixers, related mixing equipment, mud pits, storage facilities or units, composition separators, heat exchangers, sensors, gauges, pumps, compressors, and the like used to generate, store, monitor, regulate, and/or recondition the exemplary cement compositions. The disclosed cement compositions may also directly or indirectly affect any transport or delivery equipment used to convey the cement compositions to a well site or downhole such as, for example, any transport vessels, conduits, pipelines, trucks, tubulars, and/or pipes used to compositionally move the cement compositions from one location to another, any pumps, compressors, or motors (e.g., topside or downhole) used to drive the cement compositions into motion, any valves or related joints used to regulate the pressure or flow rate of the cement compositions, and any sensors (i.e., pressure and temperature), gauges, and/or combinations thereof, and the like. The disclosed cement compositions may also directly or indirectly affect the various downhole equipment and tools that may come into contact with the cement compositions/additives such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber-optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

As discussed previously, loss zones are often detected too late during cementing operations. Many times a loss zone is never detected or is only detected when the top of cement is not where it is expected to be, resulting in delays and added expense.

The disclosed technology addresses the foregoing by providing a method for locating a loss zone while cementing a well casing in a well bore. In one aspect, a fiber-optic cable for one or more Distributed Fiber-Optic Sensing (DFOS) systems is inserted into the well bore before cementing. While cementing the well casing, a loss circulation signature is detected at a particular point along the fiber-optic cable by at least one of the one or more DFOS systems. The loss zone is then located within the well bore based on the point along the fiber-optic cable at which the loss circulation signature was detected. In some embodiments, an amount of loss may also be determined based on one or more characteristics of the detected loss circulation signature.

In various embodiment, the one or more DFOS systems comprise one or more of a Distributed Temperature Sensing (DTS) system, a Distributed Strain Sensing (DSS) system, and a Distributed Acoustic Sensing (DAS) system. The loss circulation signature comprises one or more of: a temperature signature detected by a DTS system, or a strain signature detected by a DSS system, or a strain signature detected by a DAS system, or a microseimic signature detected and processed by data from a DAS system, or a pressure signature detected by a pressure sensor, or an interferometric signature detected by an interferometric sensing system.

In one embodiment, detecting the loss circulation signature is performed based on a comparison of input from the one or more DFOS systems with one or more stored profiles of known loss zone characteristics. In another embodiment, detecting the loss circulation signature may be performed by a machine learning system, such as a neural network, that receives input from the one or more DFOS systems. In such an embodiment, detecting the loss circulation signature includes comparing input from the one or more DFOS systems with one or more stored profiles generated by a machine learning system based on previously discovered loss zones.

In some embodiments, the fiber-optic cable is inserted into the well casing prior to the cementing operation. The fiber-optic cable may be coupled to a cementing top plug inserted into the well casing before pumping cement into the well casing. The location of the loss zone is then determined at least in part by the location of the top plug when the loss circulation signature is detected.

Alternatively, the fiber-optic cable is inserted into an annulus around the well casing in the well bore. In some cases, the fiber-optic cable may be clamped on an outside surface of the well casing. In other embodiments, the fiber-optic cable is secured within permanently installed sensors that are cemented in place in the annulus.

In certain embodiments, a cementer may be notified in real-time about the location of the loss zone and, if determined, the loss amount. The cementer may be notified by transmitting information about the loss zone to one or more of a computer terminal, tablet, cell phone, and/or smart watch accessible to the cementer.

Alternatively or in addition, information about the loss zone may be transmitted to a cementing control system, which automatically controls one or more parameters of a cementing operation in real-time based on the information about the loss zone. The one or more parameters may include, for example, pumping pressure, cement density, and/or retarder concentration.

In one embodiment, an indication of the loss zone, including the location and amount of loss, may be stored for subsequent well planning, since wells are often drilled in the same area and may encounter the same loss zone.

According to another aspect, a system for locating a loss zone while cementing a well casing in a well bore may include a fiber-optic cable having one or more DFOS systems. The fiber-optic cable may be inserted before a cementing operation into the well casing or an annulus around the well casing in the well bore.

The system may also include a processor coupled to the fiber-optic cable. The processor may be configured to determine a particular point along the fiber-optic cable at which at least one of the one or more DFOS systems has detected a loss circulation signature. Thereafter, the processor may locate the loss zone within the well bore based on the point along the fiber-optic cable at which the loss circulation signature was detected.

In yet another aspect, a computer-readable medium may include instructions that, when executed by a processor, cause the processor to perform a method including: receiving input from a fiber-optic cable inserted before a cementing operation into the well casing or an annulus around the well casing in the well bore, wherein the fiber-optic cable includes one or more DFOS systems; detecting, during a cementing operation, a loss circulation signature at a particular point along the fiber-optic cable by at least one of the one or more DFOS systems; and locating the loss zone within the well bore based on the point along the fiber-optic cable at which the loss circulation signature was detected.

Referring now to FIG. 1, a system that may be used in cementing operations will now be described. FIG. 1 illustrates a system 2 for preparation of a cement composition and delivery to a well bore in accordance with certain embodiments. As shown, the cement composition may be mixed in mixing equipment 4, such as a jet mixer, recirculating mixer, or a batch mixer, for example, and then pumped via pumping equipment 6 to the well bore. In some embodiments, the mixing equipment 4 and the pumping equipment 6 may be disposed on one or more cement trucks as will be apparent to those of ordinary skill in the art. In some embodiments, a jet mixer may be used, for example, to continuously mix the composition, including water, as it is being pumped to the well bore.

Figure 2A:
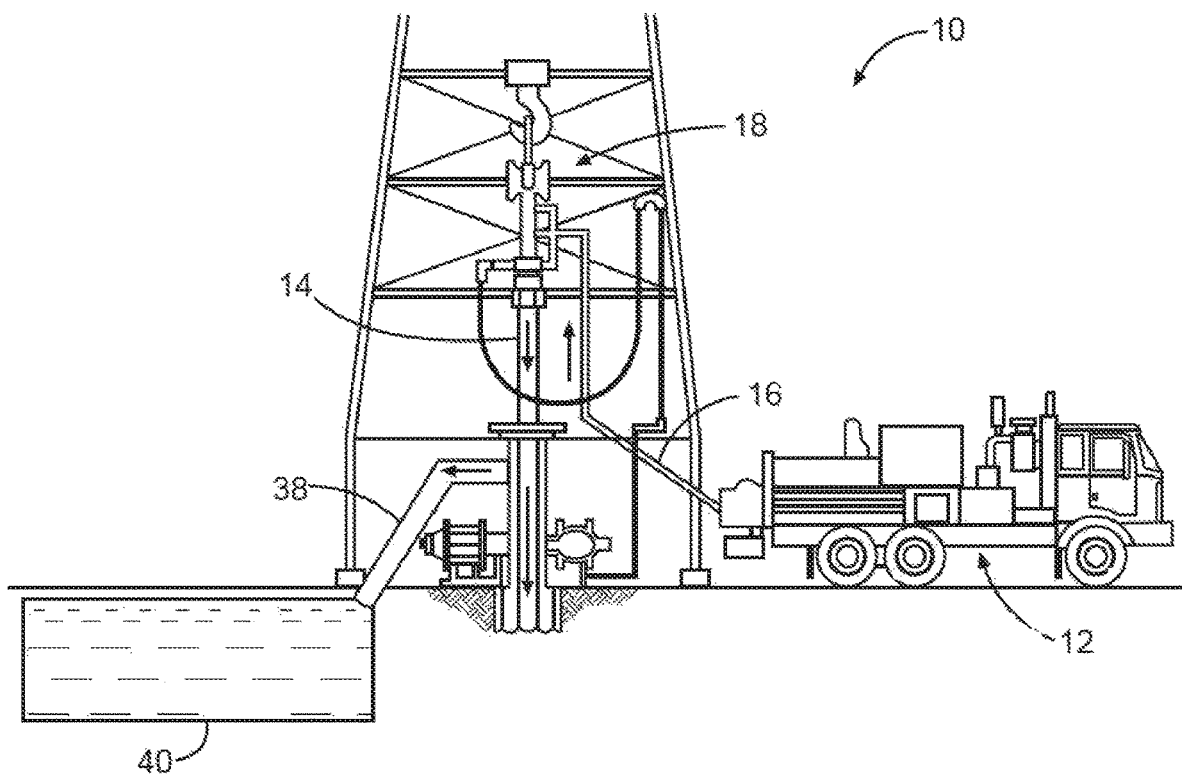
FIG. 2A illustrates surface equipment that may be used in placement of a cement composition in a well bore in accordance with aspects of the present disclosure.

An example technique and system for placing a cement composition into a subterranean formation will now be described with reference to FIGS. 2A and 2B. FIG. 2A illustrates surface equipment 10 that may be used in placement of a cement composition in accordance with certain embodiments. It should be noted that while FIG. 2A generally depicts a land-based operation, those skilled in the art will readily recognize that the principles described herein are equally applicable to subsea operations that employ floating or sea-based platforms and rigs, without departing from the scope of the disclosure. As illustrated by FIG. 2A, the surface equipment 10 may include a cementing unit 12, which may include one or more cement trucks. The cementing unit 12 may include mixing equipment 4 and pumping equipment 6 (e.g., FIG. 1) as will be apparent to those of ordinary skill in the art. The cementing unit 12 may pump a cement composition 14 through a feed pipe 16 and to a cementing head 18 which conveys the cement composition 14 downhole.

Figure 2B:
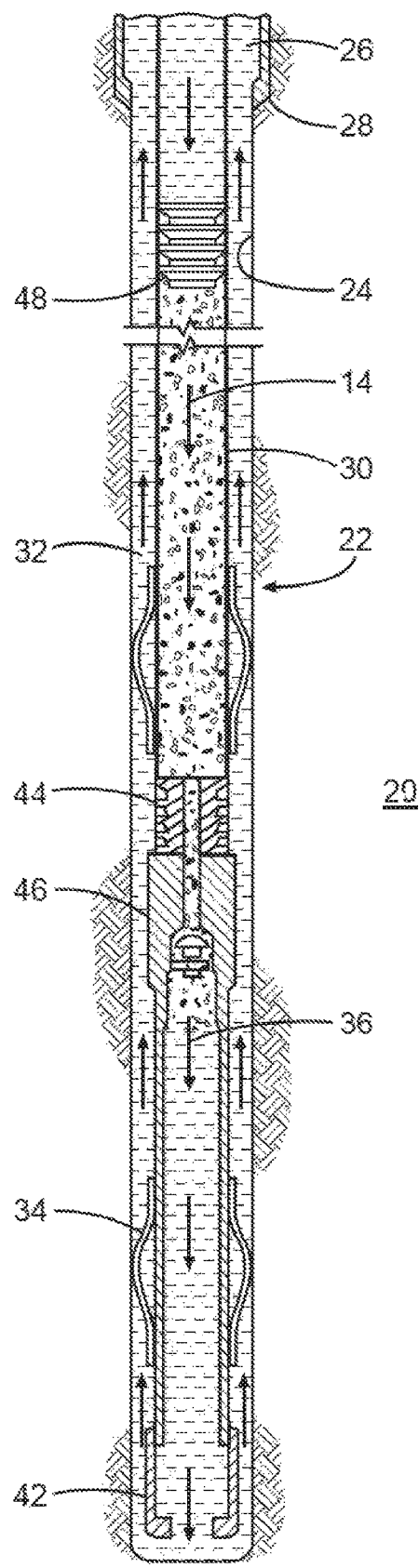
FIG. 2B illustrates placement of a cement composition into a well bore annulus in accordance with aspects of the present disclosure.

Turning now to FIG. 2B, the cement composition 14 may be placed into a subterranean formation 20 in accordance with example embodiments. As illustrated, a well bore 22 may be drilled into the subterranean formation 20. While well bore 22 is shown extending generally vertically into the subterranean formation 20, the principles described herein are also applicable to well bores that extend at an angle through the subterranean formation 20, such as horizontal and slanted well bores. As illustrated, the well bore 22 comprises walls 24. In the illustrated embodiments, a surface casing 26 has been inserted into the well bore 22. The surface casing 26 may be cemented to the walls 24 of the well bore 22 by cement sheath 28. In the illustrated embodiment, one or more additional conduits (e.g., intermediate casing, production casing, liners, etc.) shown here as casing 30 may also be disposed in the well bore 22. As illustrated, there is a well bore annulus 32 formed between the casing 30 and the walls 24 of the well bore 22 and/or the surface casing 26. One or more centralizers 34 may be attached to the casing 30, for example, to centralize the casing 30 in the well bore 22 prior to and during the cementing operation.

With continued reference to FIG. 2B, the cement composition 14 may be pumped down the interior of the casing 30. The cement composition 14 may be allowed to flow down the interior of the casing 30 through the casing shoe 42 at the bottom of the casing 30 and up around the casing 30 into the well bore annulus 32. The cement composition 14 may be allowed to set in the well bore annulus 32, for example, to form a cement sheath that supports and positions the casing 30 in the well bore 22. While not illustrated, other techniques may also be utilized for introduction of the cement composition 14. By way of example, reverse circulation techniques may be used that include introducing the cement composition 14 into the subterranean formation 20 by way of the well bore annulus 32 instead of through the casing 30.

As it is introduced, the cement composition 14 may displace other fluids 36, such as drilling fluids and/or spacer fluids, that may be present in the interior of the casing 30 and/or the well bore annulus 32. At least a portion of the displaced fluids 36 may exit the well bore annulus 32 via a flow line 38 and be deposited, for example, in one or more retention pits 40 (e.g., a mud pit), as shown on FIG. 2A.

Referring again to FIG. 2B, a bottom plug 44 may be introduced into the casing 30 ahead of the cement composition 14, for example, to separate the cement composition 14 from the fluids 36 that may be inside the casing 30 prior to cementing. After the bottom plug 44 reaches the landing collar 46, a diaphragm or other suitable device ruptures to allow the cement composition 14 through the bottom plug 44. In FIG. 2B, the bottom plug 44 is shown on the landing collar 46. In the illustrated embodiment, a top plug 48 may be introduced into the well bore 22 behind the cement composition 14. The top plug 48 may separate the cement composition 14 from a displacement fluid 53 and also push the cement composition 14 through the bottom plug 44.

Figure 3A:
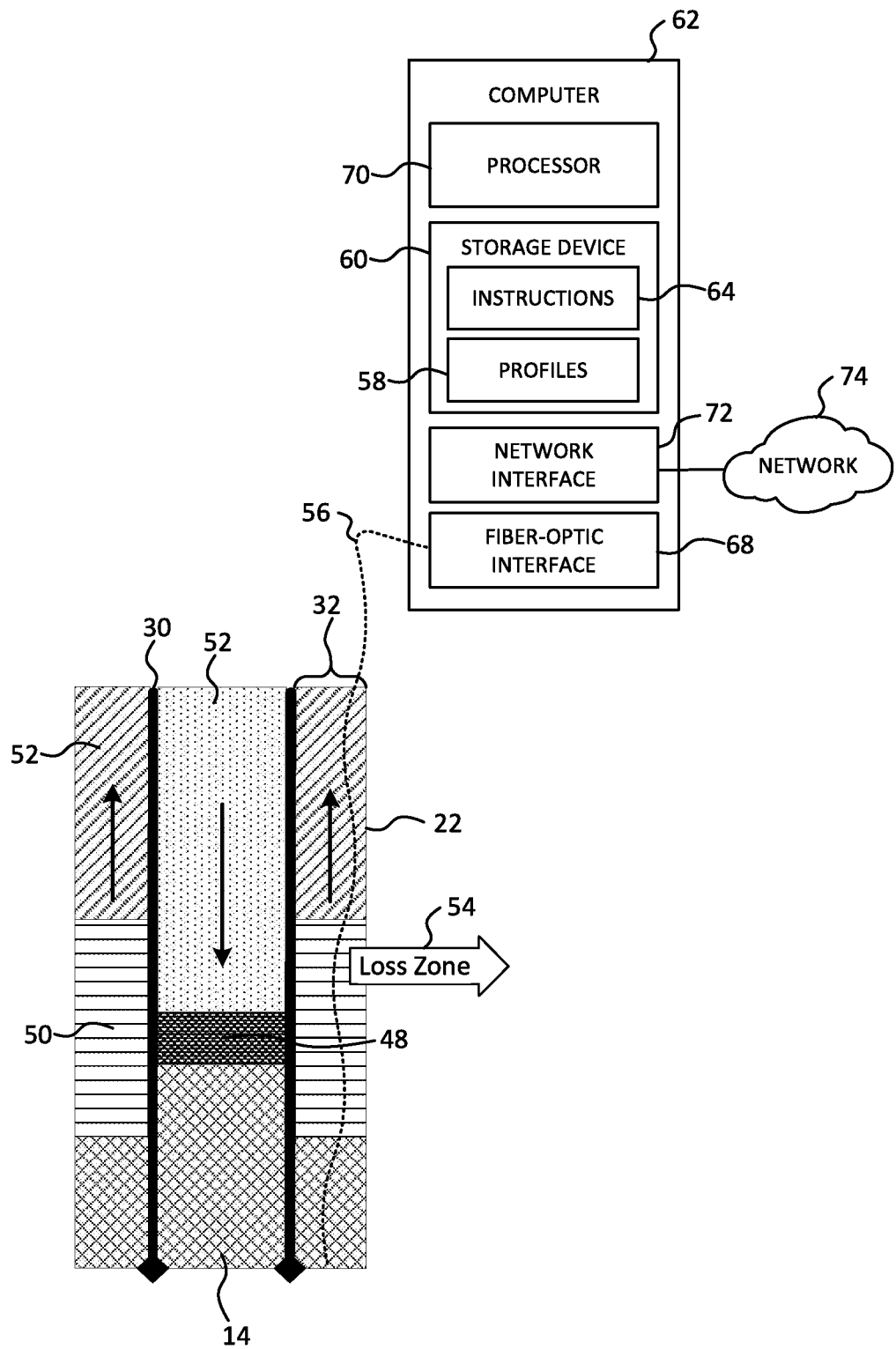
FIGS. 3A-3C are schematic diagrams of systems for locating a loss zone during a cementing operation in accordance with aspects of the present disclosure.

FIG. 3A is a schematic diagram of a system for locating a loss zone according to an embodiment of the present disclosure. A well bore 22 of the type shown in FIGS. 2A and 2B is depicted in the process of a cementing operation. As previously described, the cement composition 14 may be pumped down the interior of the casing 30, through the casing shoe (not shown) at the bottom of the casing 30, and up around the casing 30 into the well bore annulus 32. As it is pumped, the cement composition 14 may displace various fluids, such as a spacer fluid 50 and a drilling fluid 52 ("mud"). A top plug 48 may be introduced into the casing 30 after the cement composition 14. The top plug 48 may separate the cement composition 14 from a displacement fluid 53 pumped into the casing 30 after the cement composition 14.

Those skilled in the art will recognize that the foregoing represents one cementing technique. Another cementing technique usable in the context of the present disclosure is referred to as "reverse cementing," in which the cement composition 14 is pumped from the outside of the casing 30 down through the well bore annulus 32. An advantage of such a technique is that pumping pressure can be substantially lower and the pumping pressure window can be smaller. However, a plug cannot be used in reverse cementing, necessitating different procedures for determining when the cement composition 14 has reached the bottom of the well bore 22.

Occasionally, the well bore 22 may traverse one or more loss zones 54. A loss zone 54 is a permeable zone adjacent to a less permeable zone. A loss zone may be a naturally occurring region of the reservoir, such as layers and fractures formed during the natural geologic process. Unfortunately, detecting a loss zone 54 during a cementing operation is difficult and may delay completion of a well and/or increase costs.

In one embodiment, a loss zone 54 may be detected during the cementing process by inserting a fiber-optic cable 56 configured for one or a combination of thermal, acoustic, and/or strain sensing into the well bore annulus 32. As described in greater detail below, the fiber-optic cable 56 may use the above-sensing function(s) to determine the location of the loss zone 54, as well obtain estimate real-time losses.

Although FIG. 3A depicts a conventional (i.e., through the casing 30) cementing operation, embodiments of the present disclosure may be used in reverse cementing, where the cement composition 14 is introduced by way of the well bore annulus 32 instead of through the casing 30.

In one embodiment, information is relayed from the fiber-optic cable 56 to the surface in real-time and may be used to modulate various operational parameters, such as flow rate, density of the fluids, and cement/spacer design. In some embodiments, the fiber-optic cable 56 may relay information reflecting the severity and location of the loss zone 54, allowing cementers to mitigate the effects of loss circulation caused by the loss zone 54.

The fiber-optic cables 56 may house one or more optical fibers. The optical fibers may be single mode fibers, multi-mode fibers, or a combination of single mode and multi-mode optical fibers. One or more Distributed Fiber-Optic Sensing (DFOS) systems may be connected to the optical fibers, including, without limitation, Distributed Temperature Sensing (DTS) systems, Distributed Acoustic Sensing (DAS) Systems, Distributed Strain Sensing (DSS) systems, quasi-distributed sensing systems where multiple single point sensors are distributed along an optical fiber/cable, or single point sensing systems where the sensors are located at the end of the fiber-optic cable 56.

DTS systems, for example, are optoelectronic devices that measure temperatures by means of fiber-optic cables functioning as linear sensors. DTS systems transmit approximately 1 m laser pulses (equivalent to a 10 ns time) into the fiber-optic cable. As the pulse travels along the length of the fiber-optic cable, it interacts with the glass. Due to small imperfections in the glass, a tiny amount of the original laser pulse is reflected back to towards the DTS system. By analyzing the reflected light, the DTS system is able to calculate the temperature of the event (by analyzing the power of the reflected light) and also the location of the event (by measuring the time it takes the backscattered light to return). Temperatures are recorded along the fiber optic cable as a continuous profile. A high accuracy of temperature determination is achieved over great distances. Typically, the DTS systems can locate the temperature to a spatial resolution of 1 m with accuracy to within ±1° C. at a resolution of 0.01° C.

DAS systems use fiber-optic cables 56 to provide distributed acoustic and/or strain sensing. In DAS, the fiber-optic cable 56 becomes the sensing element and measurements are made, and in part processed, using an attached optoelectronic device. Such a system allows dynamic measurements caused by acoustic and/or strain signals impacting the optical fiber where frequency and/or amplitude signals can be detected over large distances and in harsh environments. Strain events can be due to mechanical strain and/or thermally induced strain in the optical fiber.

DFOS systems may operate using various sensing principles including but not limited to:
 i) amplitude-based sensing systems, such as DTS systems based on Raman scattering,
 ii) phase-sensing-based systems or intensity-sensing-based systems, such as DAS systems based on interferometric sensing using, e.g., homodyne or heterodyne techniques, where the system may sense phase or intensity changes due to constructive or destructive interference, where interferometric signals may be used to detect interferometric signatures and/or processed into time series data and/or frequency/amplitude data and/or other frequency domain data for subsequent processing and filtering where the filtering/processing may generate interferometric signatures,
 iii) strain-sensing systems, such as DSS systems using dynamic strain measurements based on interferometric sensors or static strain sensing measurements using, e.g., Brillouin scattering,
 iv) quasi-distributed sensors based on, e.g., Fiber Bragg Gratings (FBGs) where a wavelength shift is detected or multiple FBGs are used to form Fabry-Perot type interferometric sensors for phase or intensity-based sensing, and/or
 v) single point fiber-optic sensors based on Fabry-Perot or FBG or intensity based sensors.
 vi) Electrical sensors may be pressure sensors based on quartz-type sensors or strain-gauge-based sensors or other commonly used sensing technologies. Pressure sensors, optical or electrical, may be housed in dedicated gauge mandrels or attached outside the casing in various configurations for down-hole deployment or deployed at the surface well head or flow lines.

Various hybrid approaches may be employed where single point or quasi-distributed or distributed fiber-optic sensors are mixed with, e.g., electrical sensors. The fiber-optic cable 56 may then include optical fiber and electrical conductors.

Temperature measurements from, e.g., a DTS system, may be used to determine locations for fluid inflow in the treatment well as the fluids from the surface are likely to be cooler than formation temperatures. It is known in the industry to use DTS warm-back analyses to determine fluid volume placement and location, which is often done for water injection wells (the same technique can be used for fracturing fluid placement). Temperature measurements in observation wells can be used to determine fluid communication between the treatment well and observation well, or to determine formation fluid movement. The temperature measurements over distance can be used to identify loss zones and volume of fluid/cement that entered the loss zone. The volume entering the loss zone can be determined using warm-back analysis or through fluid front velocity changes by tracking thermal events as they move along the wellbore. The thermal event velocity may e.g. decrease by 50% if half of the fluid goes into a loss zone. Thermal events may be generated by heating or cooling fluid/cement to a temperature different than the normal temperature of the fluid that is being pumped.

DAS data can be used to determine fluid allocation in real-time as acoustic noise is generated when fluid flows through the casing and in through perforations into the formation. Phase- and intensity-based interferometric sensing systems are sensitive to temperature and mechanical as well as acoustically induced vibrations. DAS data can be converted from time-series data to frequency-domain data using Fast Fourier Transforms (FFT), and other transforms like wavelet transforms may also be used to generate different representations of the data. Various frequency ranges can be used for different purposes and where, e.g., low frequency signal changes may be attributed to formation strain changes or fluid movement and other frequency ranges may be indicative if fluid or gas movement. Various fluids may be introduced to generate boundaries between different fluids such that fluid velocities can be tracked with the DAS system, or different fluids may have different noise profiles, or various materials may be introduced in the fluids as active acoustic noise makers for tracking purposes. DAS data can also be used for microseimic monitoring where small earth quakes (aka micro seismic events) can be triangulated. These microseismic events may be generated by fluid entering the loss zone and fracturing rock and/or lubricating formation layers enabling them to shift and thereby to induce microseismic events and the size i.e. length/width/height/azimuth of the microseismic event cloud may be calculated from the events detected by microseismic monitoring. This can be used to identify loss zones and predict loss zones and/or natural fractures in a reservoir with multiple wells to enable mitigation of current and future cementing operations. The microseismic event cloud may also be mapped against existing seismic surveys for a better predictor of future well performance, completion and cementing challenges.

Various filtering techniques may be applied to generate indicators of events than may be of interest. Indicators may include, without limitation, formation movement due to growing natural fractures, formation stress changes during the fracturing operations (i.e., stress shadowing), fluid seepage during the fracturing operation as formation movement may force fluid into an observation well, fluid flow from fractures, as well as fluid and proppant flow from frac hits.

Each of the foregoing indicators of a lost zone 54 may have a characteristic signature in terms of frequency content and/or amplitude and/or time dependent behavior. Every flow has, for example, a sound signature. Flow in a loss zone 54 has a different sound signature than flow through other zone types. A loss zone 54 may also have a particular temperature signature and/or pressure signature. The signatures may be detected using DAS-, DTS-, or DSS-capable fiber-optic cable 56. Signatures and/or various indicators of loss circulation may also be present in other data types and not limited to DAS, DTS, or DSS data.

For purposes of this disclosure, the characteristic signatures and/or indicators used for detecting loss zones 54 and other causes of loss circulation may be stored as profiles 58. A process of using profiles 58 in the context of detecting loss zones 54 will be described in greater detail below.

DAS systems can also be used to detect various seismic events where stress fields and/or growing fracture networks generate microseimic events or where perforation charge events may be used to determine travel time between horizontal wells, and this information can be used from stage to stage to determine changes in travel time as the formation is fractured and filled with fluid and proppant. The DAS systems may also be used with surface seismic sources to generate vertical seismic profiles before, during and after a fracturing job to determine the effectiveness of the fracturing job as well as determine production effectiveness. Fluid entering loss zones may introduce changes in the acoustic velocity and may also be detected using vertical seismic profiling.

DSS data can be generated using various approaches and static strain data can be used to determine absolute strain changes over time. Static strain data is often measured using Brillouin-based systems or quasi-distributed strain data from FBG based system. Static strain may also be used to determine propped fracture volume by looking at deviations in strain data from a measured strain baseline before fracturing a stage. It may also be possible to determine formation properties like permeability, poroelastic responses and leak off rates based on the change of strain vs time and the rate at which the strain changes over time. Dynamic strain data can be used in real-time to detect fracture growth through an appropriate inversion model, and appropriate actions like dynamic changes to fluid flow rates in the treatment well, addition of diverters or chemicals into the fracturing fluid or changes to proppant concentrations or types can then be used to mitigate detrimental effects.

FBG-based systems may also be used for a number of different measurements. FBGs are partial reflectors that can be used as temperature and strain sensors, or can be used to make various interferometric sensors with very high sensitivity. FBGs can be used to make point sensors or quasi-distributed sensors where these FBG based sensors can be used independently or with other types of fiber-optic based sensors. FBGs can manufactured into an optical fiber at a specific wavelength, and other system like DAS, DSS or DTS systems may operate at different wavelengths in the same fiber and measure different parameters simultaneously as the FBG-based systems using Wavelength Division Multiplexing (WDM).

The sensors can be placed in either the treatment well or monitoring well(s) to measure well communication. The treatment well pressure, rate, proppant concentration, diverters, fluids and chemicals may be altered to change the hydraulic fracturing treatment. These changes may impact the formation responses in several different ways, including:
  i) stress fields may change, and this may generate microseismic effects that can be measured with DAS systems and/or single point seismic sensors like geophones,
  ii) fracture growth rates may change and this can generate changes in measured microseismic events and event distributions over time, or changes in measured strain using the low frequency portion or the DAS signal or Brillouin based sensing systems,
  iii) pressure changes due to poroelastic effects may be measured in the monitoring well,
  iv) pressure data may be measured in the treatment well and correlated to formation responses, and/or
  v) various changes in treatment rates and pressure may generate events that can be correlated to fracture growth rates.

Several measurements can be combined to determine adjacent well communication, and this information can be used to change the hydraulic fracturing treatment schedule to generate desired outcomes, as explained in greater detail below.

As previously noted, the sound, pressure, and stress signatures of loss zones 54 may be digitally represented as profiles 58. In one embodiment, the profiles 58 are comprise one or more data structures stored in a storage device 60 of a computer 62. The storage device 60 may be implemented using various volatile and non-volatile storage devices and systems, including, without limitation, random-access memory (RAM), read-only memory (ROM), magnetic storage (hard disc drives), optical storage devices, cloud-based storage, or the like. The storage device 60 may also be used to store computer-executable instructions (programs) 64 configured for implementing aspects of the methods described herein.

The computer 62 may include a fiber-optic interface 68 for transmitting and receiving light pulses via the fiber-optic cable 56 and converting received pulses into digital data usable by a processor 70. The fiber-optic interface 68 may be a component of a DFOS system and may be referred to in some embodiments as an "interrogator," such as a DTS, DAS, and/or DSS interrogator.

The processor 70 may be embodied, without limitation, as a microprocessor, application-specific integrated circuit (ASIC), digital signal processor (DSP), field-programmable gate array (FPGA) or the like. The processor 70 executes the stored instructions 64 and controls the various other components of the computer 62.

The computer 62 may also include a network interface 72 for connecting the computer 62 to a network 74, such as a local area network (LAN) or a wide area network (WAN), such as the Internet. In one embodiment, when the fiber-optic interface 68 receives temperature, pressure, and/or acoustic data that is consistent with one of the stored profiles 58, the computer 62 may transmit information including of the location and severity of the loss zone 54 via the network interface 72 to the cementers such that remedial action may be taken. The information may be delivered in real-time to a computer terminal, tablet, cell phone, smart watch or other device used by cementers in the form of a notification or alert.

After being notified about a loss zone 54, the cementer may choose to pump more cement composition 14 to offset the losses, lower the pumping pressure, and/or reduce the density of the cement composition 14. If the loss zone 54 is detected before the cement has been pumped, the cementer may also choose to enhance the retarder concentration in the cement design, so that the thickening time is large enough for the situation. If a loss zone 54 is detected early, the cementers can put down a viscous plug (not shown) to stop losses. In some cases, a thermal slug (not shown) can be pumped down to see the difference once it hits a loss zone.

In other embodiments, the information about the location and/or severity of the loss zone 54 may be sent to a cementing control system to automatically control the amount of cement composition 14 pumped, the pumping pressure, etc., in real-time.

Information about detected loss zones 54 may also be useful in planning other wells, since many wells are often drilled in the same area and may encounter the same subterranean formations. Accordingly, the location and severity of the loss zone 54 may be stored in the storage device 60 or a remote database (not shown) for future well planning.

Figure 3B:
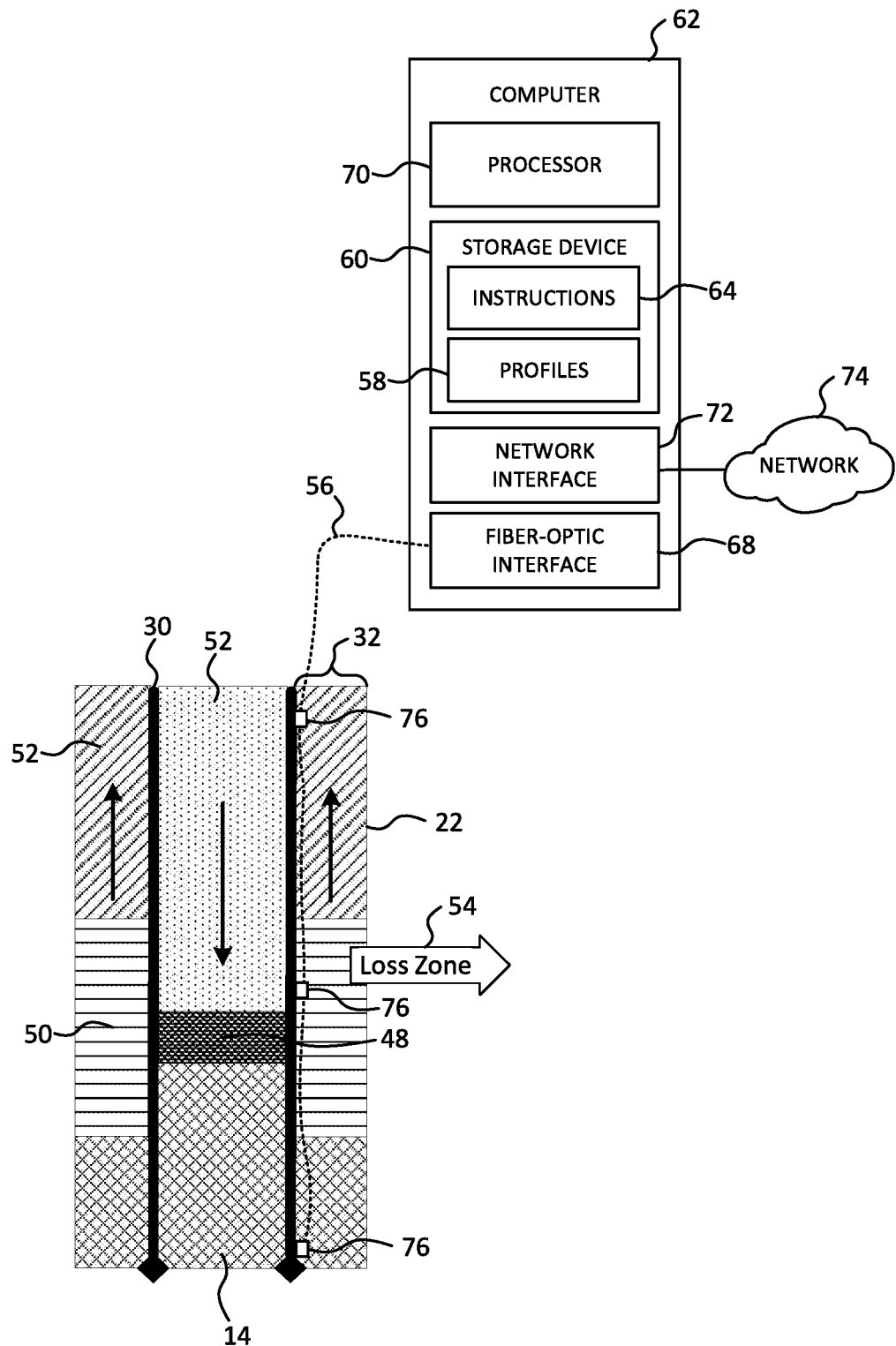

FIG. 3B is a schematic diagram of a system for locating loss zones according to another embodiment of the present disclosure. In this embodiment, permanently installed sensors 76 may be deployed within the well bore annulus 32. The sensors 76 may include fiber-optic cables 56 cemented in place in the well bore annulus 32 between the casing 30 and formation. In one embodiment, the fiber-optic cables 56 may be clamped to the outside of the casing 30 during the deployment and protected by centralizers and cross coupling clamps (not shown). Other types of permanent sensors 76 may include surface and down-hole pressure sensors, where the pressure sensors may be capable of collecting data at rates up to 2,000 Hz or even higher.

Figure 3C:
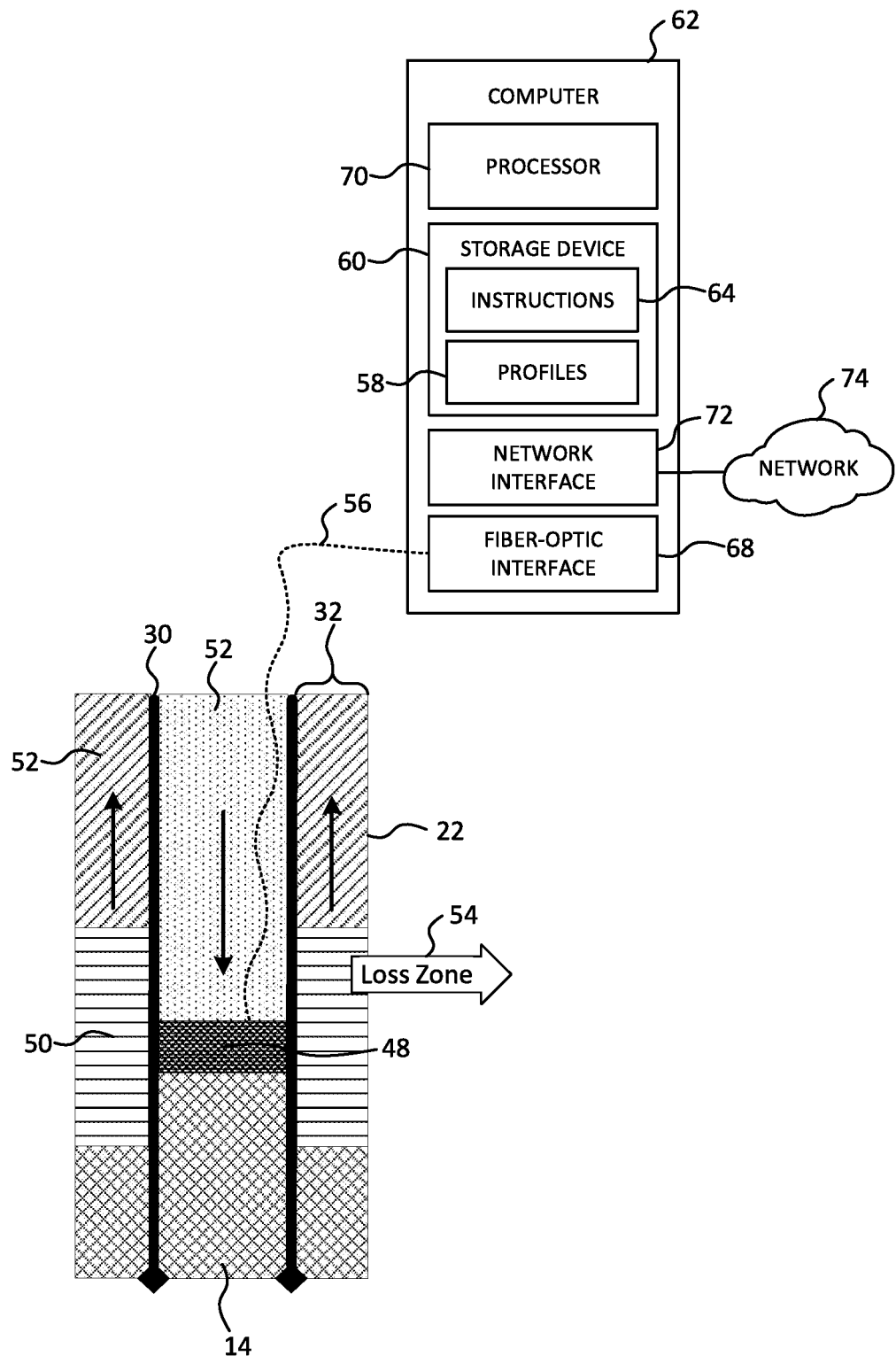

FIG. 3C is a schematic diagram of a system for locating loss zones according to yet another embodiment of the present disclosure. As illustrated, the fiber-optic cable 56 may be inserted into the casing 30 rather than the well bore annulus 32 before the cementing operation. In one embodiment, the fiber-optic cable 56 is coupled to the top plug 48. During deployment of the top plug 48, the loss zone 54 may be detected, at least in part, using the location of the top plug 48 and the location of various fluids in real-time.

Figure 4:
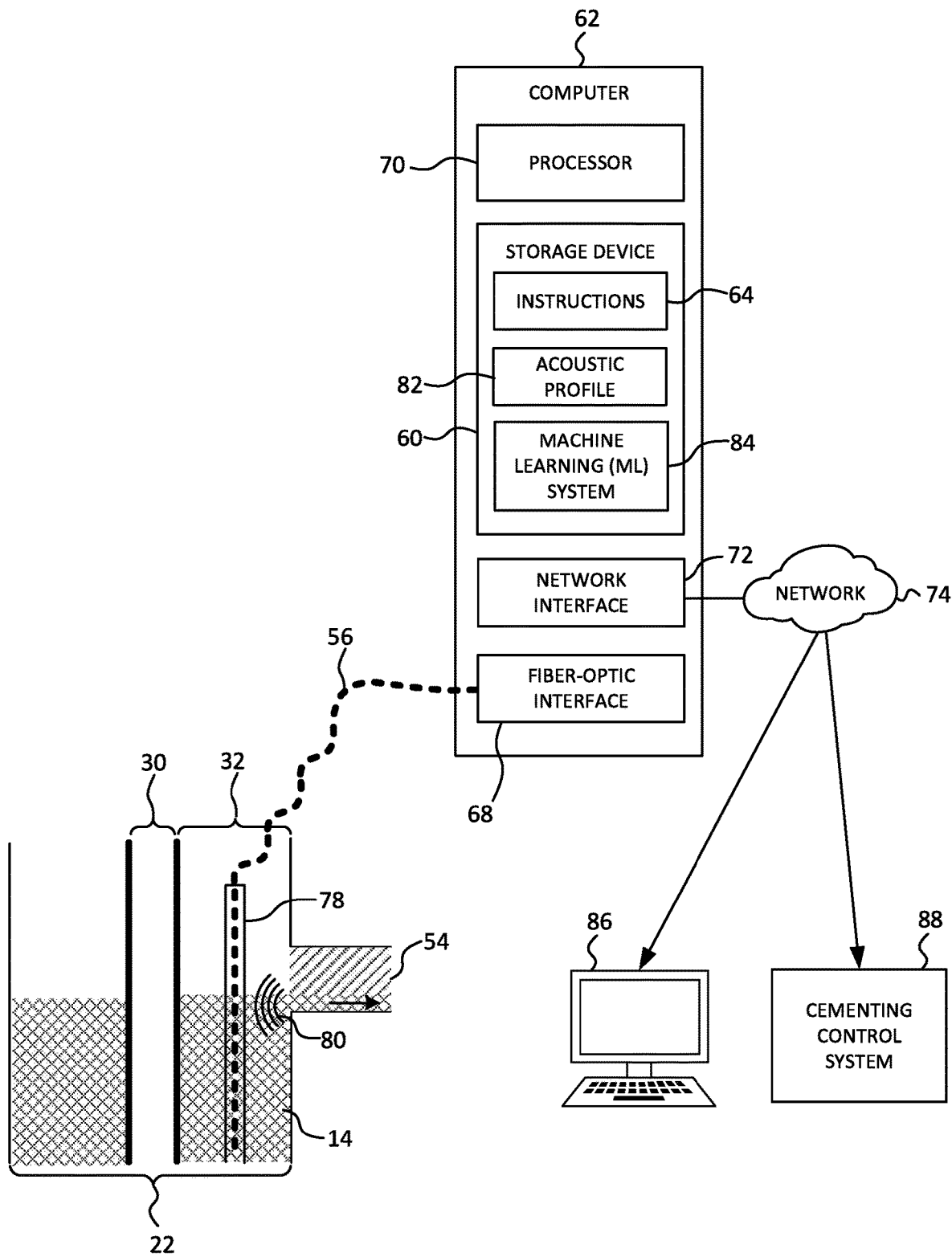
FIG. 4 is a schematic diagram of an exemplary embodiment in which a fiber-optic cable with a distributed acoustic sensing (DAS) system is used to detect a loss zone in accordance with aspects of the present disclosure.

FIG. 4 is a schematic diagram of an exemplary embodiment in which the fiber-optic cable 56 is a component of a Distributed Acoustic Sensing (DAS) system 78. Those of skill in the art will recognize that the fiber-optic cable could be used by multiple DFOS systems, including, without limitation, Distributed Temperature Sensing (DTS) and/or Distributing Strain Sensing (DSS) systems. However, for simplicity, only a DAS system 78 is depicted in this embodiment. In some configurations, the fiber-optic interface 68 in the computer 62 may be part of the DAS system 78. In other embodiments, the fiber-optic interface 68 may be configured to receive telemetry from the DAS system 78 using a wired or wireless connection.

As the cement composition 14 fills the annulus 32, it may begin to flow into a loss zone 54. Such a flow has an acoustic signature 80, which is detectable at a particular point along the fiber-optic cable 56. The DAS 78 converts the acoustic signature 80 into light signals that are transmitted through the fiber-optic cable 56 to the fiber-optic interface 68, where the light signals are converted into electrical signals and digitized for analysis by the processor 70.

The processor 70 may then analyze the acoustic signature 80 in the time and/or frequency domain to determine whether the acoustic signature 80 corresponds to a stored acoustic profile 82 of a loss zone 54. Profiles 82 may be created in one embodiment based on known characteristics of loss zones 54 determined through experimentation and scientific analysis. For example, the acoustic profile 82 may indicate that particular sound frequencies/amplitudes and/or patterns of frequencies/amplitudes are indicative of a loss zone 54.

Those of skill in the art will recognize that if DTS and/or DSS are employed, temperature and/or stress signatures, respectively, may be analyzed to identify respective stored temperature and/or stress profiles. Loss zones 54 may be identified, in various embodiments, based on one or a combination of acoustic, temperature, and/or stress signatures. Different profiles may be used for different types of signatures or a single profile may be used with multiple signatures.

In one embodiment, if acoustic profile 82 that corresponds to the acoustic signature 80 is found in the storage device 60, the processor 70 locates the loss zone 54 within the well bore 22 based on the point along the fiber-optic cable 56 at which the acoustic signature 80 was detected. This may be the point, for example, at which the acoustic signature 80 is detected most strongly by the DAS 78, since the acoustic signature 80 will be detected at various points along fiber-optic cable 56.

The processor 70 may also determine from one or more characteristics of the acoustic signature 80 the amount of loss of the cement composition 14 and/or other liquids to the loss zone 54. For example, the amplitude of the acoustic signature 80 may differ depending upon the amount of loss circulation.

In one embodiment, a machine learning (ML) system 84, such as a neural network, may be used to determine whether certain acoustic, temperature, and/or stress signatures correspond with a potential loss zone 54. In such a case, the profile may be embodied, for example, as a collection of weights in a hidden layer of the neural network. The hidden layer may be created in response to training the neural network using acoustic, temperature, and/or stress signatures from previous cementing operations where the location of the loss zone 54 was determined. The ML system 84 may be implemented within the computer 62 (as illustrated) or accessed remotely via the network 74.

When the loss zone 54 is detected, the network interface 72 may transmit the location of the loss zone 54 (and, if determined, the amount of loss of the cement composition 14 and/or other fluids) to the cementer via the network 74 in the form of a real-time alert or other notification. For example, an alert may be sent to a device used by the cementer, such as a computer terminal 86 (as shown) and/or a tablet, cell phone, or smart watch. Whether (and how) to notify the cementer may be determined by software settings stored in the computer 62.

As previously noted, the cementer may choose to pump more cement composition 14 to offset the losses, lower the pumping pressure, and/or reduce the density of the cement composition 14. If the loss zone 54 is detected before the cement has been pumped, the cementer may also choose to enhance the retarder concentration in the cement design, so that the thickening time is large enough for the situation. If a loss zone 54 is detected early, the cementers can put down a viscous plug to stop losses.

Alternatively, or in addition, the network interface 72 may transmit the location of the loss zone 54 (and, if determined, the amount of loss) to a cementing control system 88, which may automatically adjust one or more parameters of the cementing process, such as the pumping pressure, density, and/or retarder concentration of the cement composition 14. A variety of other adjustments may be performed automatically by the cementing control system 88 to mitigate and/or repair the loss zone 54.

Figure 5:
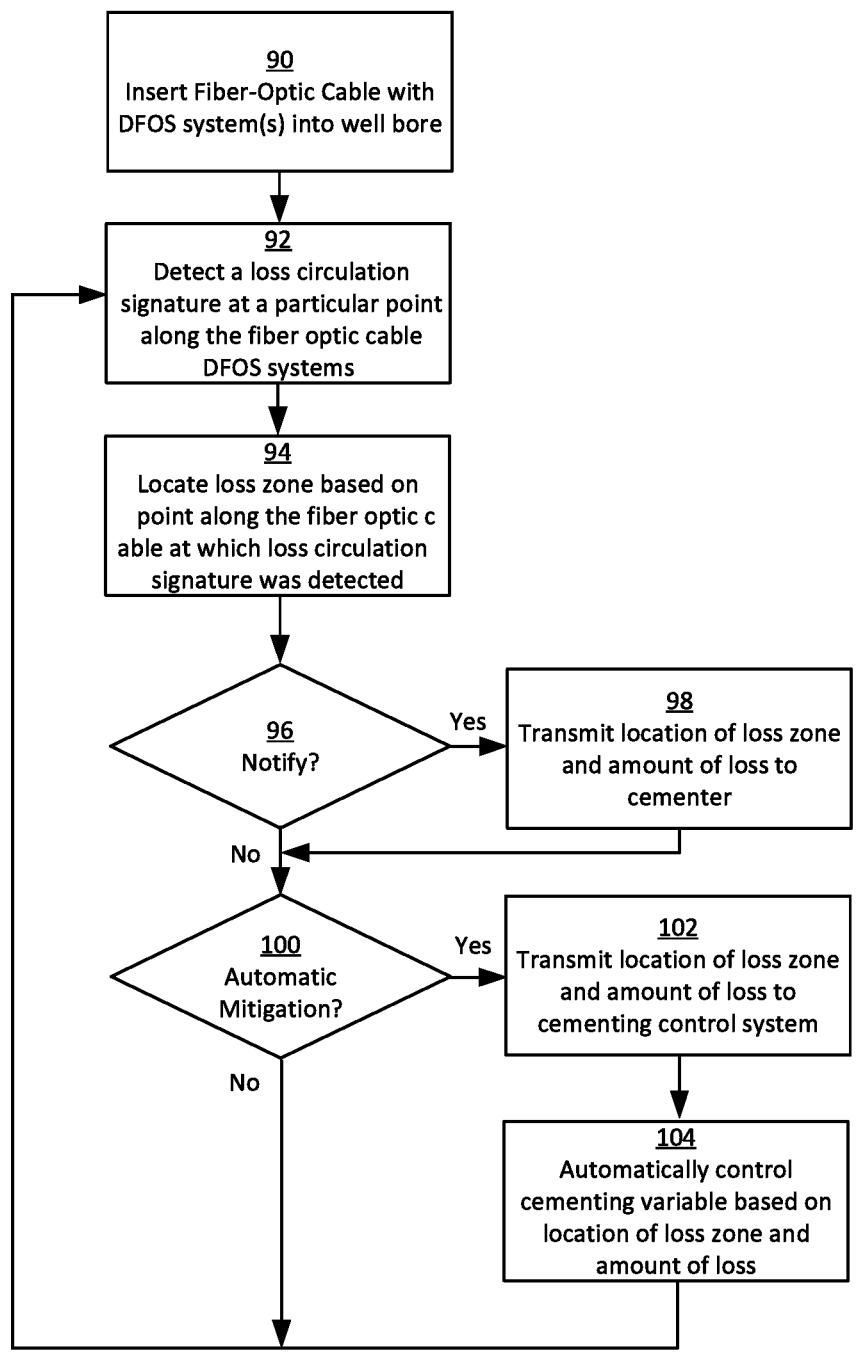
FIG. 5 is a flowchart of a method for locating and mitigating a loss zone while cementing a well casing within a well bore in accordance with aspects of the present disclosure.

FIG. 5 is a flowchart of a method for locating and mitigating a loss zone while cementing a well casing within a well bore. Initially, a fiber-optic cable having one or more DFOS systems is inserted 90 into the well bore. During the cementing operation, a loss circulation signature is then detected at a particular point along the fiber-optic cable by at least one of the one or more DFOS systems. Thereafter, the loss zone is located 94 within the well bore based on the point along the fiber-optic cable at which the loss circulation signature was detected.

A determination 96 is then made whether to notify a cementer about the loss zone based on one or more stored settings. If so, a notification or alert including the location of the loss zone (and, optionally, the amount of loss) is transmitted 90 to a communication device of the cementer.

A determination 100 is then made whether to initiate automatic mitigation of the loss zone. If so, the location of the loss zone (and, optionally, the amount of loss) is transmitted 102 to a cementing control system, which automatically controls 104 one or more cementing parameters based on the transmitted information. The cementing parameters may include, without limitation, one or more of the pumping pressure, rate, density, and/or retarder concentration of the cement composition.

In addition to detecting loss zones, the above-described technology may also be used to detect kicks. A kick is a well control problem in which the pressure found within the drilled rock is higher than the mud hydrostatic pressure acting on the borehole or rock face. When this occurs, the greater formation pressure has a tendency to force formation fluids into the wellbore. In some embodiments, the above-described systems and methods may be configured to detect a kick signature. Like a loss zone signature, a kick signature may be an acoustic, temperature, and/or strain signature indicative of a kick that is detectable using DAS, DTS, and/or DSS, respectively.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the disclosed concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the method, algorithms, and/or operations described above. The computer-readable data storage medium may form part of a computer program product, which may include packaging materials.

The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

In the above description, terms such as "upper," "upward," "lower," "downward," "above," "below," "downhole," "uphole," "longitudinal," "lateral," and the like, as used herein, shall mean in relation to the bottom or furthest extent of the surrounding wellbore even though the wellbore or portions of it may be deviated or horizontal. Correspondingly, the transverse, axial, lateral, longitudinal, radial, etc., orientations shall mean orientations relative to the orientation of the wellbore or tool. Additionally, the illustrate embodiments are illustrated such that the orientation is such that the right-hand side is downhole compared to the left-hand side.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or another word that substantially modifies, such that the component need not be exact. For example, substantially cylindrical means that the object resembles a cylinder, but can have one or more deviations from a true cylinder.

The term "radially" means substantially in a direction along a radius of the object, or having a directional component in a direction along a radius of the object, even if the object is not exactly circular or cylindrical. The term "axially" means substantially along a direction of the axis of the object. If not specified, the term axially is such that it refers to the longer axis of the object.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. The described features and steps are disclosed as possible components of systems and methods within the scope of the appended claims.

Moreover, claim language reciting "at least one of" a set indicates that one member of the set or multiple members of the set satisfy the claim. For example, claim language reciting "at least one of A and B" means A, B, or A and B.

Statements of the disclosure include:

Statement 1. A method for locating a loss zone while cementing a well casing in a well bore, the method comprising: inserting a fiber-optic cable into the well bore, wherein the fiber-optic cable is part of one or more Distributed Fiber-Optic Sensing (DFOS) systems; detecting a loss circulation signature, while cementing the well casing, at a point along the fiber-optic cable by at least one of the one or more DFOS systems; and locating the loss zone within the well bore based on the point along the fiber-optic cable at which the loss circulation signature was detected.

Statement 2. The method of statement 1, wherein the one or more DFOS systems comprises one or more of a Distributed Temperature Sensing (DTS) system, a Distributed Strain Sensing (DSS) system, and a Distributed Acoustic Sensing (DAS) system.

Statement 3. The method of statement 1 and 2, wherein the loss circulation signature comprises one or more of:

a temperature signature detected by a Distributed Temperature Sensing (DTS) system, or a strain signature detected by a Distributed Strain Sensing (DSS) system, or a strain signature detected by a Distributed Acoustic Sensing (DAS) system, or a microseimic signature detected and processed by data from a DAS system, or a pressure signature detected by a pressure sensor, or an interferometric signature detected by an interferometric sensing system.

Statement 4. The method of statements 1 through 3, wherein the point along the fiber-optic cable comprises the point along the fiber-optic cable at which the at least one of the one or more DFOS systems detects the loss circulation signature most strongly.

Statement 5. The method of statements 1 through 4, wherein detecting the loss circulation signature comprises using a machine learning system that receives input from the one or more DFOS systems.

Statement 6. The method of statements 1 through 5, wherein the machine learning system comprises a neural network.

Statement 7. The method of statements 1 through 6, wherein detecting the loss circulation signature comprises comparing input from the one or more DFOS systems with one or more stored profiles of known loss zone characteristics.

Statement 8. The method of statements 1 through 7, wherein the input from the one or more DFOS systems is compared by a processor with the one or more stored profiles.

Statement 9. The method of statements 1 through 8, wherein detecting the loss circulation signature comprises comparing input from the one or more DFOS systems with one or more stored profiles generated by a machine learning system based on previously discovered loss zones.

Statement 10. The method of statements 1 through 9, further comprising: determining an amount of loss based on one or more characteristics of the loss circulation signature.

Statement 11. The method of statements 1 through 10, wherein inserting the fiber-optic cable into the well bore comprises inserting the fiber-optic cable into the well casing.

Statement 12. The method of statements 1 through 11, wherein inserting the fiber-optic cable into the well casing comprises coupling the fiber-optic cable to a cementing top plug inserted into the well casing before pumping cement into the well casing, and wherein locating the loss zone is based on a location of the cementing top plug when the loss circulation signature is detected.

Statement 13. The method of statements 1 through 12, wherein inserting the fiber-optic cable into the well bore comprises inserting the fiber-optic cable into an annulus around the well casing in the well bore.

Statement 14. The method of statements 1 through 13, wherein inserting the fiber-optic cable into the annulus comprises: clamping the fiber-optic cable on an outside surface of the well casing.

Statement 15. The method of statements 1 through 14, wherein inserting the fiber-optic cable into the annulus comprises: securing the fiber-optic cable within permanently installed sensors that are cemented in place in the annulus.

Statement 16. The method of statements 1 through 15, further comprising: notifying a cementer about the loss zone in real-time.

Statement 17. The method of statements 1 through 16, wherein notifying comprises: transmitting information about the loss zone to one or more of computer terminal, tablet, cell phone, and/or smart watch of the cementer.

Statement 18. The method of statements 1 through 17, further comprising: transmitting information about the loss zone to a cementing control system; and automatically controlling, via the cementing control system, at least one parameter of a cementing operation in real-time based on the information about the loss zone.

Statement 19. The method of statements 1 through 18, wherein the at least one parameter comprises one or more of pumping pressure, rate, cement density, cement composition, or retarder concentration.

Statement 20. The method of statements 1 through 19, further comprising: storing an indication of the loss zone for use in subsequent well planning.

Statement 21. A system for locating a loss zone while cementing a well casing in a well bore, the system comprising: one or more Distributed Fiber-Optic Sensing (DFOS) systems comprising a fiber-optic cable, wherein the fiber-optic cable is inserted before cementing into the well casing or an annulus around the well casing in the well bore; and a processor coupled to the fiber-optic cable, wherein the processor is configured to determine, while cementing, a point along the fiber-optic cable at which at least one of the one or more DFOS systems has detected a loss circulation signature and locate the loss zone within the well bore based on the point along the fiber-optic cable at which the loss circulation signature was detected.

Statement 22. A computer-readable medium comprising instructions that, when executed by a processor, cause the processor to perform a method for locating a loss zone while cementing a well casing in a well bore, the method comprising: receiving input from a fiber-optic cable inserted before cementing into the well casing or an annulus around the well casing in the well bore, wherein the fiber-optic cable is part of one or more Distributed Fiber-Optic Sensing (DFOS) systems; detecting, while cementing, a loss circulation signature at a point along the fiber-optic cable by at least one of the one or more DFOS systems; and locating the loss zone within the well bore based on the point along the fiber-optic cable at which the loss circulation signature was detected.

What is claimed is:

1. A method for locating a loss zone while cementing a well casing in a wellbore with cement, the method comprising:

inserting a fiber-optic cable into the wellbore, wherein the fiber-optic cable is part of one or more Distributed Fiber-Optic Sensing (DFOS) systems;

comparing, based on operation of a machine learning (ML) system, data received from the one or more DFOS systems with a plurality of different loss circulation signatures;

identifying, based on the operation of the ML system, that the data received from the one or more DFOS systems corresponds to a loss circulation signature of the plurality of different loss circulation signatures while the well casing is cemented, wherein the loss circulation signature is associated with a point along the fiber-optic cable;

locating the loss zone within the wellbore based on the loss circulation signature being associated with the point along the fiber-optic cable at which the loss circulation signature was identified; and adjusting, based on the operation of the ML system, a property of the cement to mitigate losses of the loss zone.

2. The method of claim 1, wherein the one or more DFOS systems comprises one or more of a Distributed Temperature Sensing (DTS) system, a Distributed Strain Sensing (DSS) system, and a Distributed Acoustic Sensing (DAS) system.

3. The method of claim 1, where the loss circulation signature comprises one or more of:
- a temperature signature detected by a Distributed Temperature Sensing (DTS) system,
- a strain signature detected by a Distributed Strain Sensing (DSS) system,
- a strain signature detected by a Distributed Acoustic Sensing (DAS) system,
- a micro-seismic signature detected and processed with data from the DAS system,
- a pressure signature detected by a pressure sensor, or
- an interferometric signature detected by an interferometric sensing system.

4. The method of claim 1, wherein the point along the fiber-optic cable corresponds to a maximum detected acoustic signature.

5. The method of claim 1, wherein the property of the cement is at least one of a cement density, a cement composition, or a cement retarder concentration.

6. The method of claim 1, wherein the ML system comprises a neural network.

7. The method of claim 1, wherein the loss circulation signature is identified based on the plurality of different loss circulation signatures being associated with one or more stored profiles of known loss zone characteristics.

8. The method of claim 7, wherein the data received from the one or more DFOS systems is compared by a processor with the one or more stored profiles.

9. The method of claim 1, wherein the loss circulation signature is identified based on comparing input from the one or more DFOS systems with one or more stored profiles generated by the ML system based on previously discovered loss zones.

10. The method of claim 1, further comprising:
determining an amount of losses based on one or more characteristics of the loss circulation signature.

11. The method of claim 1, wherein inserting the fiber-optic cable into the wellbore comprises inserting the fiber-optic cable into the well casing.

12. The method of claim 11, wherein inserting the fiber-optic cable into the well casing comprises coupling the fiber-optic cable to a cementing top plug inserted into the well casing before pumping the cement into the well casing, and the loss zone is located based on a location of the cementing top plug when the loss circulation signature is detected.

13. The method of claim 1, wherein inserting the fiber-optic cable into the wellbore comprises inserting the fiber-optic cable into an annulus around the well casing in the wellbore.

14. The method of claim 13, wherein inserting the fiber-optic cable into the annulus comprises:
clamping the fiber-optic cable on an outside surface of the well casing.

15. The method of claim 13, wherein inserting the fiber-optic cable into the annulus comprises:
securing the fiber-optic cable within permanently installed sensors that are cemented in place in the annulus.

16. The method of claim 1, further comprising:
notifying a cementer about the loss zone in real-time.

17. The method of claim 16, wherein the notifying comprises:
transmitting information about the loss zone to one or more of a computer terminal, tablet, cell phone, and/or and a smart watch associated with the cementer.

18. The method of claim 1, further comprising:
transmitting information about the loss zone to a cementing control system; and
automatically controlling, via the cementing control system, at least one parameter of a cementing operation in real-time based on information about the loss zone.

19. The method of claim 18, wherein the at least one parameter comprises one or more of pumping pressure or a flow rate.

20. The method of claim 1, further comprising:
storing an indication of the loss zone for use in subsequent well planning.

21. A system for locating a loss zone while cementing a well casing in a wellbore, the system comprising:
one or more Distributed Fiber-Optic Sensing (DFOS) systems comprising a fiber-optic cable;
a memory; and
a processor that executes instructions of a machine learning (ML) system out of the memory to:
compare data received from the one or more DFOS systems with a plurality of different loss circulation signatures,
identify that the data received from the one or more DFOS systems corresponds to a loss circulation signature of the plurality of different loss circulation signatures while the well casing is cemented, wherein the loss circulation signature is associated with a point along the fiber-optic cable, and
locate the loss zone within the wellbore based on the loss circulation signature being associated with the point along the fiber-optic cable at which the loss circulation signature was identified, wherein a property of the cement is adjusted to mitigate losses of the loss zone based on operation of the ML system.

22. A non-transitory computer-readable medium comprising instructions of a machine learning (ML) system that, when executed by a processor, cause the processor to perform a method for locating a loss zone while cementing a well casing in a wellbore, the method comprising:
comparing, based on operation of a machine learning (ML) system, data received from one or more Distributed Fiber-Optic Sensing (DFOS) systems with a plurality of different loss circulation signatures;
identifying, based on the operation of the ML system, that the data received from the one or more DFOS systems corresponds to a loss circulation signature of the plurality of different loss circulation signatures while the well casing is cemented, wherein the loss circulation signature is associated with a point along a fiber-optic cable; and
locating the loss zone within the wellbore based on the loss circulation signature being associated with the point along the fiber-optic cable at which the loss circulation signature was identified, wherein a property of the cement is adjusted to mitigate losses of the loss zone based on the operation of the ML system.

* * * * *